US011175779B1

(12) United States Patent
Pamanek et al.

(10) Patent No.: US 11,175,779 B1
(45) Date of Patent: Nov. 16, 2021

(54) POSITION REFINEMENT IN A TOUCH INDICATING ARRAY

(71) Applicant: NXP USA, INC., Austin, TX (US)

(72) Inventors: David Pamanek, Roznov pod Radhostem (CZ); Petr Zelinka, Roznov pod Radhostem (CZ)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 17/127,339

(22) Filed: Dec. 18, 2020

(51) Int. Cl.
    *G06F 3/041* (2006.01)
(52) U.S. Cl.
    CPC ................................ *G06F 3/04186* (2019.05)
(58) Field of Classification Search
    CPC .................................................. G06F 3/04186
    See application file for complete search history.

(56) References Cited

U.S. PATENT DOCUMENTS

| | | | |
|---|---|---|---|
| 9,348,477 B2 | 5/2016 | Reynolds | |
| 10,768,746 B1* | 9/2020 | Pant | G06F 3/04166 |
| 11,079,878 B1* | 8/2021 | Krah | G06F 3/044 |
| 2009/0284495 A1* | 11/2009 | Geaghan | G06F 3/04883 |
| | | | 345/174 |
| 2015/0015497 A1 | 1/2015 | Leigh | |
| 2015/0091859 A1* | 4/2015 | Rosenberg | G06F 3/04166 |
| | | | 345/174 |
| 2015/0261375 A1* | 9/2015 | Leigh | G06F 3/0421 |
| | | | 345/174 |
| 2019/0102030 A1 | 4/2019 | Kakinoki | |
| 2019/0384444 A1* | 12/2019 | Wingard | G06F 3/0416 |

FOREIGN PATENT DOCUMENTS

| | | |
|---|---|---|
| CN | 109284062 A | 1/2019 |
| JP | 6222758 B2 | 11/2017 |
| JP | 2019067125 A | 4/2019 |
| TW | I444880 B | 7/2014 |

* cited by examiner

*Primary Examiner* — Ibrahim A Khan

(57) ABSTRACT

In connection with a touch indicating array device, exemplary aspects concern, a method involving the device having a touch surface and an array of sensors used to indicate a rough or coarse position, when touched, via a numeric value vector. This vector's weighted values may indicate the effective touch at each of the sensor position of the touch device. The weighted values may be processed by a module which operates on the weighted values using a discrete transform for obtaining one or more harmonic's phase of the spectral representation of the sensor array values. The resultant phase value of the first harmonic, representing a spatial phase, may then be used to refine the position within the sensor array that is more accurate than the rough or course position.

20 Claims, 5 Drawing Sheets

POSITION REFINEMENT IN A TOUCH INDICATING ARRAY

BACKGROUND

Aspects of various embodiments are directed to a touch indicating device which may include a sensor array.

Certain sensor arrays, such as a two-dimensional single touch sensor which may have a regular x-by-y grid of electrodes, the spatial resolution associated with a two-dimensional single touch as applied to the grid of electrodes, is often limited by the physical spacing of the electrodes. In certain instances, the resolution may be increased based on some sort of interpolation technique. In certain other instances, the sensor resolution may be increased as an improvement over conventional interpolation for providing higher precision but this is at the expense of significantly increasing computational complexity and/or slowing down throughput.

These and other matters have presented challenges to efficiencies of obtaining increased resolution of positions in a touch indicating array implementation, for a variety of applications.

SUMMARY

Various example embodiments of the present disclosure are directed to issues such as those addressed above and/or others which may become apparent from the following disclosure concerning increased resolution of a touch sensor array which, in some specific examples, may use low computational complexity to allow for the use of low-cost processors.

In certain example embodiments, aspects of the present disclosure involve the use weighted values from touch array sensors which may be processed to derive the phase of a first spatial harmonic. This phase may then be used to obtain a refined position, of the touch, within the array. In a more specific example, upon an effective touch, weighted values from the sensor array indicate relative position, in the array, from the effective touch. Processing of the weighted value array may use, for example, Fourier transform methodology to obtain the first spatial harmonic phase of the spectral representation of the sensor array values. This phase value may be used to refine the position of the effective touch in the array more accurately.

In a more specific example embodiment, a touch indicating device having a touch surface and an array of sensors is used to indicate a rough or coarse position, when touched, via a numeric value vector. Weighted values for the vector may indicate the effective touch at each of the sensor position of the touch device. The weighted values may be processed by a module (e.g., logic circuit and/or a CPU which may be configurable or programmable) which operates on the weighted values via a discrete transform (e.g., FFT) for obtaining the first harmonic phase of the spectral representation of the sensor array values (in some example, another phase or a combination of phases and amplitudes may be used). The resultant phase value of the first harmonic, representing a spatial phase, may then be used to refine the position within the sensor array that is more accurate than the rough or coarse position.

Another specific example embodiment involves a method wherein the sensor array is constructed with one or more rows intersecting one or more columns. Touch sensors and/or electrode crossings are located at the intersections of the rows and columns. The spacing of the electrodes may be spaced so as to be sufficiently dense relative to the object effecting the touch on the sensor array so that several sensors react to the proximity of the finger.

Other specific example embodiments, may involve a method to identify and maximize the signal-to-noise ratio associated with the touch effective indication position in the sensor array. Since the touch position is determined based on a single spatial spectral component of the available sensor data, this example method may greatly reduce negative effects of random noise (as in RF communications in which a higher signal-to-noise ratio can be achieved using a lower bandwidth in the detector). For example, by extracting only one spectral component and ignoring all other (e.g., higher) harmonics, the method may be implemented to be inherently insensitive to any distortions with high spatial frequency, such as uncorrelated noise and variations in the object associated with the touch size and/or touch shape. In certain examples, only the row and column closest to the touch position is considered (e.g., where the effects of the touch proximity are most pronounced), and the method may be used to maximize the signal-to-noise ratio achievable with a given electrode grid.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1A:
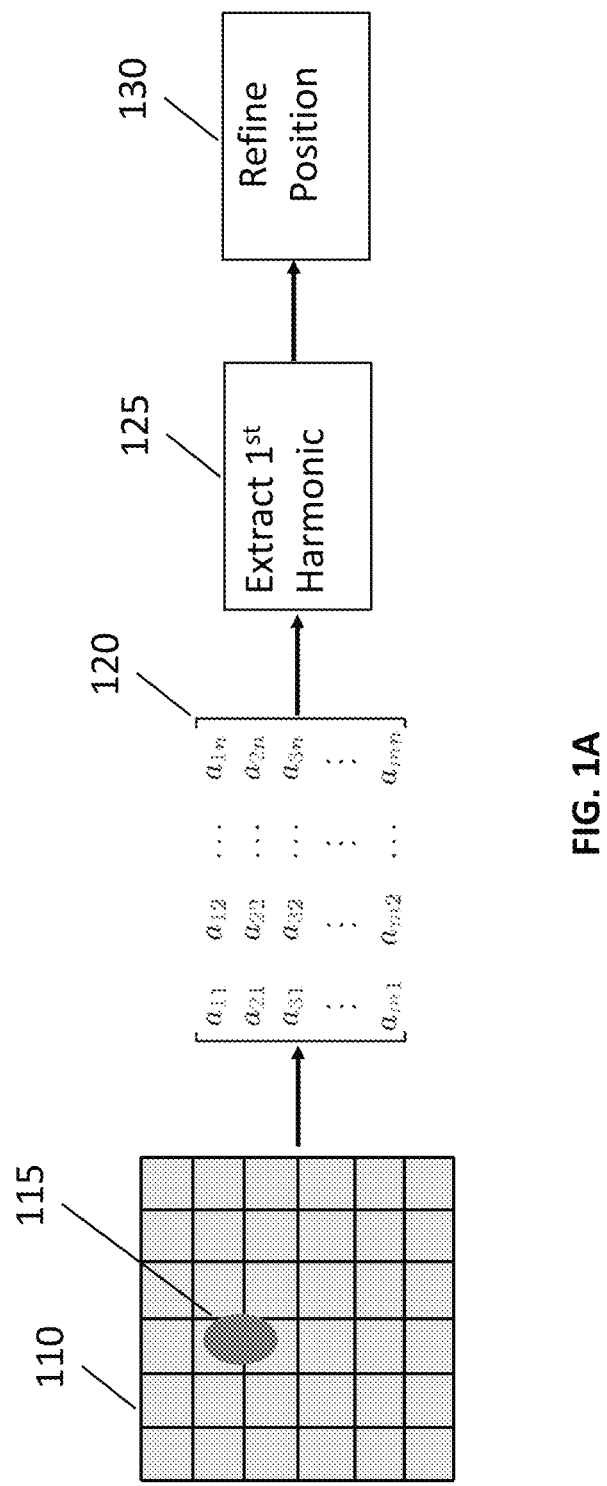
FIG. 1A is a system-level diagram illustrating an example method for detection and position interpolation of an array of touch sensors, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving touch sensitive sensor arrays configured for one- or two-dimensional topologies. In certain implementations, aspects of the present disclosure have been shown to be beneficial when used in the context of human-machine interface touchpads such as used in industrial equipment. The present disclosure may also be beneficial when used in consumer devices, with touchpads, such as printers, automotive infotainment systems, and appliances. In some embodiments, improved keypad position resolution, as described in the present disclosure, may contribute to cost reduction of a product as less circuitry is required. Improved resolution may also be used in existing devices to improve operation or features without the need to change hardware, but by a change in software/firmware. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

According to specific aspect of the instant disclosure, embodiments are directed to or involve a method using touch indicating device having a touch surface. This touch device may have an array of sensors used to indicate a rough or coarse position, when touched, via a numeric value vector. Weighted values of this vector may indicate the effective touch at each of the sensor position of the touch device. The weighted values may be processed by a module which operates on the weighted values using a discrete transform for obtaining at least one harmonic phase of the spectral representation of the sensor array values, for example, the first harmonic phase. Methods used by this module may include, for example, Fourier transforms, FFTs, DFTs, Goertzel algorithms, etc. The resultant phase value of the first harmonic, representing a spatial phase, may then be used to refine the position within the sensor array that is more accurate than the rough or coarse position.

In one specific example, embodiments are directed to methods wherein the sensor array is constructed with one or more rows intersecting one or more columns. Touch sensors, or electrode crossings, are located at the intersections of the rows and columns. For example, a device having 12 sensors may be composed of 4 rows and 3 columns (or 2 rows and 6 columns, or 12 rows and 1 column, etc.). The spacing of the electrodes may be spaced so as to be sufficiently dense relative to the object effecting the touch on the sensor array so that several sensors react to the proximity of the object (e.g. a finger).

Consistent with the above aspects, another specific example of the present disclosure involves a method to determine the refined position of the object as it touches the sensor array. This exemplary aspect is based on responses of all sensors in the closest rows and closest columns to the actual touched position (e.g., choosing the row and the column that contains the sensor with the strongest response due to the proximity effect of the touch).

In another specific example, the method of refining the touch position may use a discrete transform to obtain the phase of the first calculated harmonic of the spectral representation of the sensor array values. As the method may use only the first harmonic's phase, other spectral components may be disregarded. This implies that that methods to only calculate the first harmonic phase may be used, such as the Goertzel algorithm or a partial fast Fourier transform (FFT). Such a discrete transform may also be another transform such as a discrete Fourier transform (DFT).

Turning now to the drawings, FIG. 1A is a system-level diagram illustrating an example method for detection and position interpolation of an array of touch sensors. A touch sensor array 110 is touched as shown by the position marked 115. In response to the touch, circuitry creates a data array 120 consisting of response values from each sensor, which may be located at the intersection of each row and column. The data array 120 values may be representations of signal strength, signal-to-noise ratio (SNR), pressure, force, capacitance, etc. These data array values are then passed to a function 125 to generate and extract the first harmonic's phase. This function 125 may use a Fourier transform, partial FFT, DFT, Goertzel algorithms, wavelets, or other methods to discover the phase of the first harmonic of the spectral representation of the data array. Exploiting the information from the first harmonic's phase may then be used by the block 130 to refine the position of the touched location.

Figure 1B:
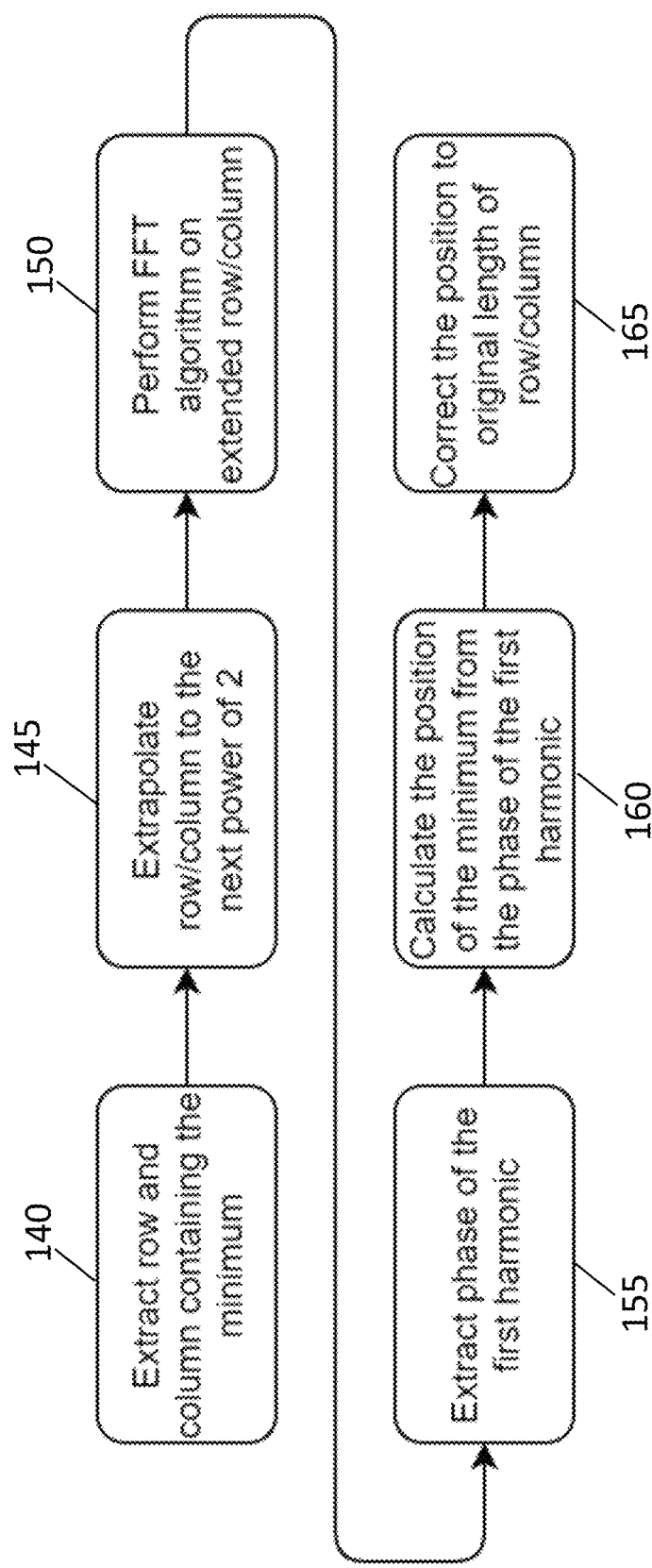
FIG. 1B is a process flow diagram illustrating an example method for position interpolation of an array of touch sensors, in accordance with the present disclosure.
Figure 2:
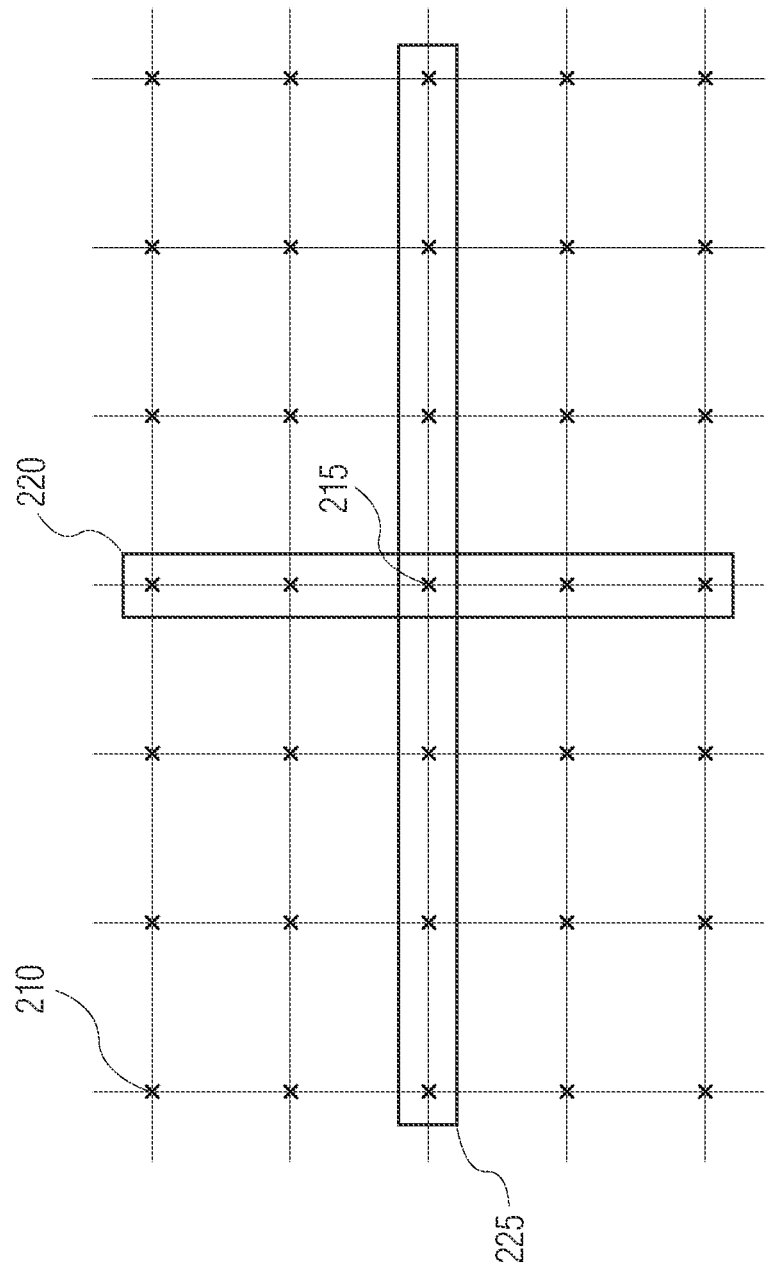
FIG. 2 is a diagram illustrating an example a two-dimensional array of touch sensors, in accordance with the present disclosure.

FIG. 1B is process flow diagram illustrating an example method for position interpolation (refinement) of an array of touch sensors (electrode crossing). The first block 140 examines the data array of touch sensor data to discover the global minimum value and records its row and column position indicating the rough position of the touch. FIG. 2 illustrates the discovery of a minimum data value of the array data 210. In this example the minimum value location has been determined and is indicated by 215. Therefore, the column of interest is indicated as 220 and the row of interest as 225. In connection with assigning weights, the values may be ascribed using a linear or nonlinear approach, for example, such that the closer the object (causing the touch) is to an electrode, the lower the node data value.

Figure 3B:
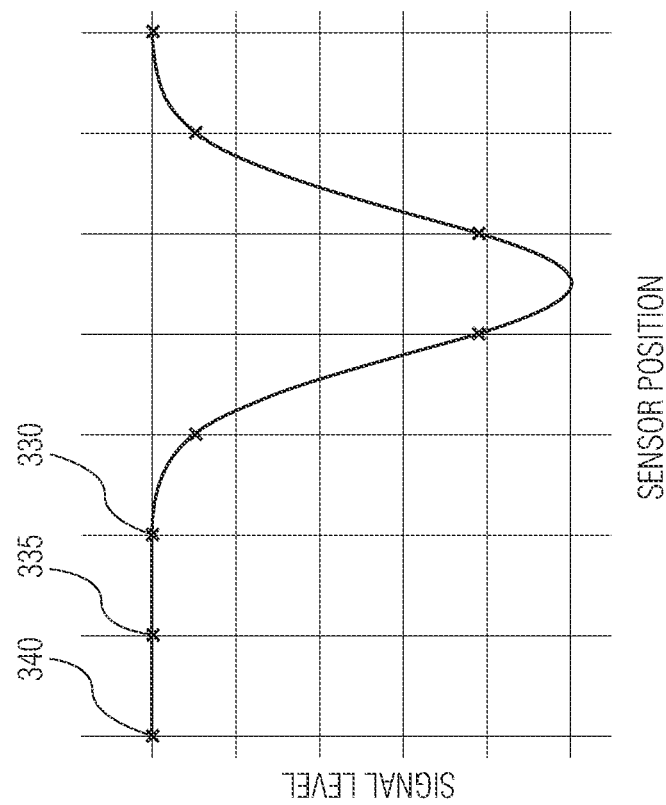
FIG. 3B is a graph illustrating an example signal level versus sensor position of left-side extrapolation of touch sensors signals, in accordance with the present disclosure.
Figure 3A:
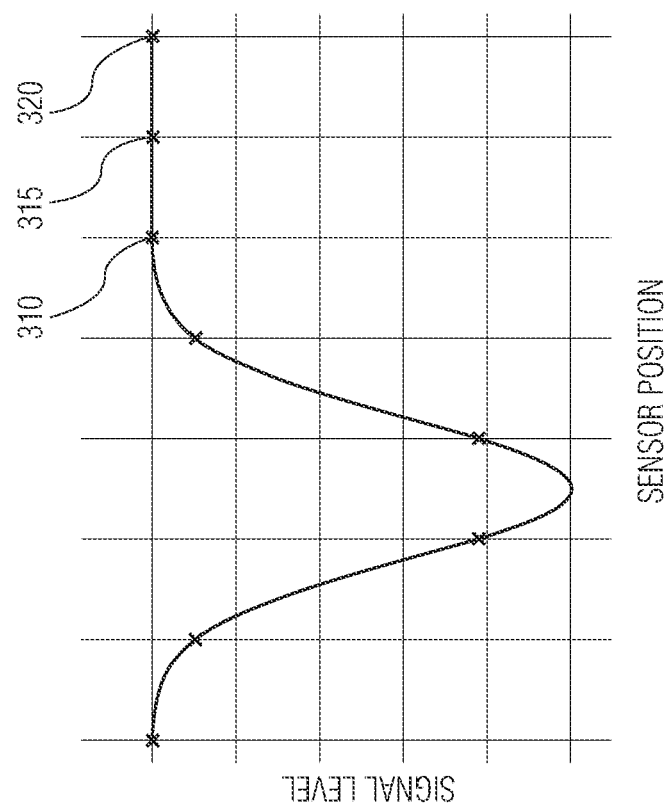
FIG. 3A is a graph illustrating an example signal level versus sensor position of right-side extrapolation of touch sensors signals, in accordance with the present disclosure.

The next block 145 in FIG. 1B extrapolates, if required, new data values so as to create a vector of data values with the length of a power of two in both the minimum value column and row. Extrapolation may be executed on the left or right of the existing data values. The decision of whether the extrapolated part should be on the left or right side is based on position of the minimum. If the minimum is in the left half of the interval, the extrapolated part goes to the right and vice versa. This extrapolation is illustrated in FIG. 3A and FIG. 3B. FIG. 3A illustrates adding a data point 320, through extrapolation, to right. The data point 320 is calculated by using existing data points, such as 310 and 315 to extrapolate its value. Similarly, FIG. 3B illustrates adding a data point 340, through extrapolation, to left. The data point 340 is calculated by using existing data points, such as 330 and 335 to extrapolate its value.

Returning to FIG. 1B, block 150 may execute a partial FFT (or DFT, Goertzel algorithm, wavelet, or other methods) to extract data representing the first spatial harmonic. Since only one spectral component is needed, the algorithm can use real-to-complex partial fast Fourier transform (FFT) to obtain the complex spectral representation of the first harmonic component. This first spatial harmonic data is then passed to block 155 which may extract the phase information of the first spatial harmonic. If the first spatial harmonic is represented by a complex number a+bi, then the phase may be calculated using the arctangent function:

$$\varphi = \tan^{-1}\left(\frac{b}{a}\right)$$

If the target processor does not implement trigonometric functions in hardware, the arctangent can be approximated by a minimax polynomial approximation, a table lookup, a CORDIC algorithm, or any other method that best fits the target processor capabilities and application needs. This calculated phase, which is in range [−π, π], can be transformed, in block 160, into position $P_e$ in range [0, 1] using the following equation:

$$P_e = \frac{\pi - \varphi}{2\pi}$$

The above calculated position $P_e$ is valid for extrapolated data. Block 165 is used to find the real refined position within the actual sensor. The refined position may be adjusted to correspond with the physical length of the respective row and column. If the original data is extended to the right, the refined position Po can be calculated using the following equation:

$$P_o = P_e \frac{L_e}{L_o}$$

where Le is length of extended vector of data and $L_o$ is length of original data. If the original data is extended to the left, the refined position can be calculated by the following equation:

$$P_o = \left(P_e - \frac{L_e - L_o}{L_e}\right)\frac{L_e}{L_o}$$

where Le is length of extended vector of data and $L_o$ is length of original data.

Figure 4:
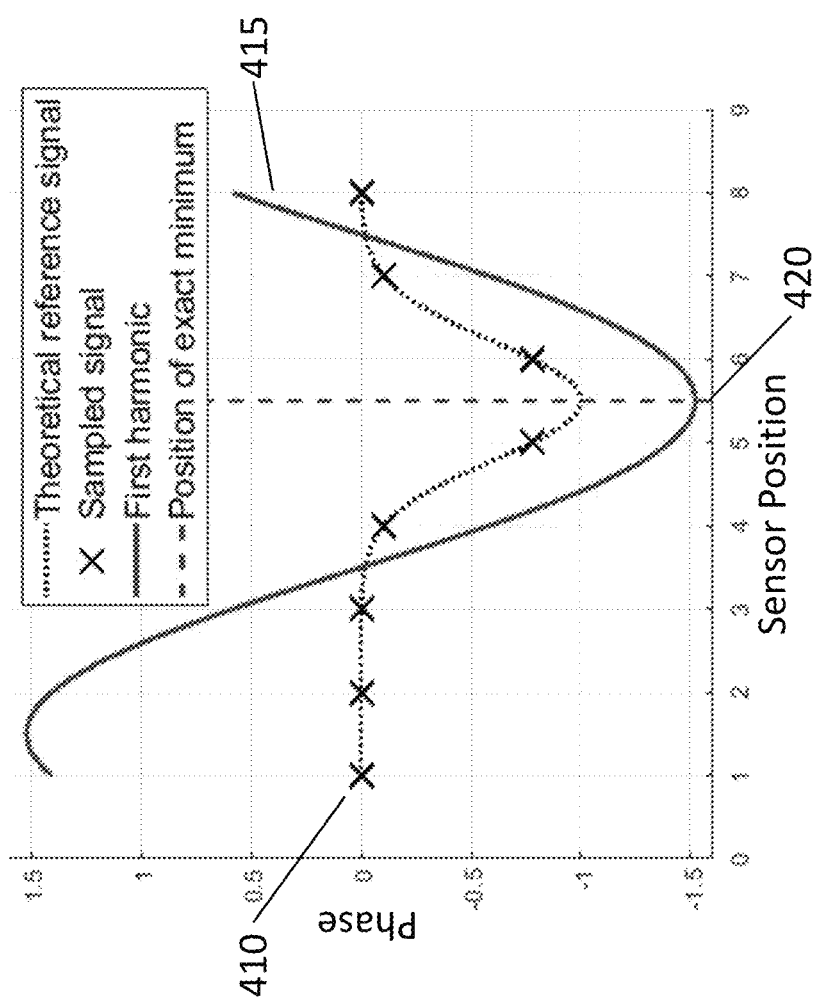
FIG. 4 is a graph illustrating an example phase versus sensor position of the processed touch sensors signals, in accordance with the present disclosure.

FIG. 4 illustrates the use of the spatial first harmonic to calculated refined position. The data array from the sensor array is shown as 410. The spatial first harmonic 415 is then extracted as described above. From the spatial first harmonic data, the phase is extracted which is shown as the refined position 420.

Another specific example of the present disclosure may involve a method to identify and maximize the signal-to-noise ratio associated with the touch effective indication position in the sensor array. Since the touch position is determined based on a single spatial spectral component of the available sensor data, the method greatly reduces negative effects of random noise. This is a well-known phenomenon in the field of signal processing and radio communications: the lower the bandwidth of the detector, the higher signal-to-noise ratio can be achieved. By extracting only one spectral component and ignoring all higher harmonics, the method is inherently insensitive to any distortions with high spatial frequency, such as uncorrelated noise and variations in the object causing the touch size and shape. Since only the row and column closest to the touch position is considered, where the effects of the touch proximity are most pronounced, the method maximizes the signal-to-noise ratio achievable with the given electrode grid.

According to one aspect of the disclosure, a method may involve an array of sensors characterized by a plurality of rows and a plurality of columns. These rows may intersect the columns at respective electrodes. If the spacing of the respective electrodes are sufficiently dense relative to the object causing the touch, the method may be immune to the size and shape variations of the object causing the touch, assuming that the area of effect of the proximity of the object causing the touch spans several electrodes.

Still another specific example of the present disclosure involves a method for processing the numeric-value vector using a partial fast Fourier transform, as only one spectral component is used. This may allow the calculation to be performed in real-time on a low-end processor due to low computational complexity. Those skilled in the art may recognize that other methods may be used to extract the spectral component such as partial FFTs, DFTs, Goertzel algorithms, etc.

In yet another example, embodiments are directed to a method for converting the phase of the first spatial harmonic to a numerical position. The numerical position is then further refined to an actual, less coarse, position in the array.

Further aspects according to the present disclosure are directed to the sensor array which may be one-dimensional. For example, a linear run which includes a plurality of electrodes.

Yet further aspects according to the present disclosure are directed to the sensor array which may be two-dimensional. For example, an array with several rows and several intersecting columns.

Another aspect of the disclosure is directed to an example apparatus which may include a touch surface with an array of sensors. The apparatus may also include processing circuitry to respond to an effective touch on the touch surface of the sensor array. This response may include identifying a rough or coarse position within the sensor array. The position may be identified via a numeric-value vector with array-location values that are weighted relative to the effective touch position of the sensor array. Processing circuitry may also process the numeric-value vector by using a Fourier transform (or related method) to obtain a value for the first spatial harmonic phase. The phase value may be further processed to obtain a more refined (less coarse or rough) position of the effective touch position relative to the sensor array.

Terms to exemplify orientation, such as upper/lower, left/right, top/bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

As examples, the Specification describes and/or illustrates aspects useful for implementing the claimed disclosure by way of various circuits or circuitry which may be illustrated as or using terms such as blocks, modules, device, system, unit, controller, and/or other circuit-type depictions (e.g., reference numerals 125 and 130 of FIG. 1A depict a block/module as described herein). Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches shown in FIGS. 1A and 1B. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described above is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As indicated above, such instructions may also be provided (e.g., downloaded via digital code) to previously-existing programmable computer circuitry (or others types of configurable logic circuits) for purposes of retrofitting and upgrading a touch-type device according to the present disclosure.

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims.

What is claimed is:

1. A method comprising:
   in response to an effective touch indicated by a device having a touch surface and an associated array of sensors, identifying a rough or coarse position within the array of sensors via a numeric-value vector with array-location values weighted relative to where the effective touch is indicated by respective sensors in the array of sensors; and
   processing the numeric-value vector by using a discrete transform to obtain a spatial harmonic phase of the spectral representation of the sensor array values and then converting the first spatial harmonic phase to a refined position within the array of sensors that is more accurate than the rough or coarse position.

2. The method of claim 1, wherein the array of sensors is characterized by a plurality of rows and a plurality of columns which intersect with the plurality of rows at respective electrodes, and the spacing of the respective electrodes is sufficiently dense relative to an object causing the effective touch.

3. The method of claim 2, further including determining the refined position based on responses of all, or a majority of, electrodes within the closest row and closest column where proximity effects of the object are most pronounced.

4. The method of claim 2, wherein using a discrete transform includes using a fast Fourier transform and ignoring or disregarding spectral components other than the first spatial harmonic phase.

5. The method of claim 1, wherein the steps of identifying and processing are carried out to increase or maximize a signal-to-noise ratio, associated with the effective touch indicated by the associated array of sensors, by said processing being insensitive to uncorrelated noise.

6. The method of claim 1, wherein the array of sensors is characterized by a plurality of rows and a plurality of columns which intersect with the plurality of rows at respective electrodes, and the spacing of the respective electrodes is sufficiently dense relative to an object causing the effective touch, and wherein an area corresponding to the rough or coarse position within the array of sensors spans several electrodes, said processing being substantially insensitive to size and/or shape of the object.

7. The method of claim 1, wherein said processing the numeric-value vector by using a Fourier transform includes processing via a partial fast Fourier transform.

8. The method of claim 1, wherein said converting includes transforming a first spatial harmonic phase to a numerical position that is uncalibrated to the array and then calibrating the numerical position to an actual position of the array.

9. The method of claim 1, wherein the array of sensors is a dimensional array with one linear run including a plurality of electrodes, and the spatial harmonic includes at least one of a first spatial harmonic and a second spatial harmonic, and excluding all spatial harmonics higher than said at least one of a first spatial harmonic and a second spatial harmonic.

10. The method of claim 1, wherein the array of sensors is a two-dimensional array having at least several rows and several intersecting columns.

11. The method of claim 1, further including configuring or programming a logic circuit with code which, in operation, causes the logic circuit to perform the steps of identifying and processing, and wherein the step of configuring or programming is part of a process for providing a new or upgraded apparatus.

12. An apparatus comprising:
    a touch surface to be integrated with an associated array of sensors; and
    processing circuitry to respond to an effective touch indicated the touch surface and the associated array of sensors, by:
       identifying a rough or coarse position within the array of sensors via a numeric-value vector with array-location values weighted relative to where the effective touch is indicated by respective sensors in the array of sensors; and
       processing the numeric-value vector by using a discrete transform to obtain the first spatial harmonic phase of the spectral representation of the sensor array values and then converting the first spatial harmonic phase to a refined position within the array of sensors that is more accurate than the rough or coarse position.

13. The apparatus of claim 12, wherein the array of sensors is characterized by a plurality of rows and a plurality of columns which intersect with the plurality of rows at respective electrodes, and the spacing of the respective electrodes is sufficiently dense relative to an object causing the effective touch.

14. The apparatus of claim 12, wherein the array of sensors is characterized by a plurality of rows and a plurality of columns which intersect with the plurality of rows at respective electrodes, and the spacing of the respective electrodes is sufficiently dense relative to an object causing the effective touch, and wherein an area corresponding to the rough or coarse position within the array of sensors spans several electrodes, said processing being substantially insensitive to size and/or shape of the object.

15. The apparatus of claim 12, wherein the array of sensors is a two-dimensional array having at least several rows and several intersecting columns.

16. The apparatus of claim 12, wherein said converting includes transforming a first spatial harmonic phase to a numerical position that is uncalibrated to the array and then calibrating the numerical position to an actual position of the array.

17. The apparatus of claim 12, wherein said processing the numeric-value vector by using a Fourier transform includes processing via a partial fast Fourier transform.

18. The apparatus of claim 12, wherein using a discrete transform includes using a fast Fourier transform and ignoring or disregarding spectral components other than the first spatial harmonic phase.

19. The apparatus of claim 12, wherein the processing circuitry is to determine the refined position based on responses of all, or a majority of, electrodes within the closest row and closest column where proximity effects of the object are most pronounced.

20. The apparatus of claim 12, wherein the processing circuitry is to process the numeric value vector towards the refined position for increasing or maximizing a signal-to-noise ratio.

* * * * *